US005725632A

United States Patent [19]

Kiss

[11] Patent Number: 5,725,632
[45] Date of Patent: Mar. 10, 1998

[54] METHOD FOR PROCESSING AND UTILIZING METALLIFEROUS PRESIPITATES FROM THE GAS CLEANING PHASE IN THERMAL WASTE TREATMENT

[75] Inventor: Günter H. Kiss, Minusio, Switzerland

[73] Assignee: Thermoselect AG, Germany

[21] Appl. No.: 823,180

[22] Filed: Mar. 24, 1997

Related U.S. Application Data

[63] Continuation of Ser. No. 408,906, Mar. 22, 1995, abandoned.

[30] Foreign Application Priority Data

Mar. 25, 1994 [DE] Germany ............... 44 10 473.1
May 5, 1994 [DE] Germany ............... 44 15 947.1

[51] Int. Cl.$^6$ .................................................. C22B 43/00
[52] U.S. Cl. ........................ 75/416; 75/419; 75/431; 75/670; 75/742
[58] Field of Search ................... 75/431, 670, 742, 75/416, 419

[56] References Cited

U.S. PATENT DOCUMENTS 4,087,276   5/1978   Generini ............................ 75/431
5,232,488   8/1993   Sanchez et al. .................... 75/431

*Primary Examiner*—Melvyn Andrews
*Attorney, Agent, or Firm*—Howard & Howard

[57] ABSTRACT

A method for processing hetrogeneous metal-containing deposits recovered from the cleaning of synthesis gas produced during the thermal treatment of wastes containing metals, including volatile metals, in equipment having a heating enclosure and a waste liquid container. The method comprises the steps of directing all of the liquids and residual solutions to the waste liquid container and directing all of the residual gases into the heating enclosure.

4 Claims, No Drawings

METHOD FOR PROCESSING AND UTILIZING METALLIFEROUS PRESIPITATES FROM THE GAS CLEANING PHASE IN THERMAL WASTE TREATMENT

This application is a continuation of U.S. application Ser. No. 08/408,906, filed Mar. 22, 1995, abandoned.

TECHNICAL FIELD

The invention relates to a method of processing and utilizing metalliferous precipitates from the gas cleaning phase in thermal waste treatment, which occur as metalliferous aqueous sediments, metal sludges or the like cleaning waste.

BACKGROUND OF THE INVENTION

In thermal waste treatment, the metal compounds contained in the waste, whose boiling point lies below the process temperature, escape together with the gaseous products and thus pass into the subsequent gas cleaning phase. In the gas cleaning and cooling phases, the metal compounds are separated by condensation and precipitation, an aqueous heavy metal hydroxide or sulphide sludge resulting. Due to the relatively small amounts of approximately 8 kg of cleaning waste per ton of waste, the heterogeneity of this sludge composite of relatively light heavy metal components (e.g. mercury) which evaporate at low temperatures, and which contain ingredients composed of chloride ions and the like which impair treatment, economical utilization of this metal waste has until now appeared neither logical nor possible. These sludges are highly toxic and in addition are chemically unstable, so that until now they had to be dumped as toxic waste in enclosed containers or the like bindings.

In order to reduce the chemical instability and the environmental damage of these materials, various methods have been proposed, such for example as cementing, ceramisation and vitrification. The advantage of these methods is that their capability for storage is improved. Re-use of these metal components could not, however, be achieved. The metal content of these materials is thus lost. The addition of stabilizers, such for example as cement, glass and concrete, leads to a situation in which the volume of the material to be dumped is substantially increased. Moreover, there is the risk that thermal treatment of the sludges, toxic substances with a low boiling point and heavy metals, which at least partly evaporate at environmental temperature, such for example as mercury, are released in an uncontrolled manner.

Storage of heavy metals cast in cement in open dumps is problematic, as long-term resistance to eluation of cemented-in heavy metal compounds is not possible, and thus there is a risk that the washed-out heavy metal components can lead to pollution of ground water. In vitrification also, binding of the heavy metals is achieved which will be released over a lengthy period. Heavy metals may be released by the formation of cracks in the vitrification.

SUMMARY OF THE INVENTION AND ADVANTAGES

The purpose of the invention is therefore to develop a method of the type already mentioned, by means of which at least economically interesting components of the metallic sludge may be subjected to a metallurgical re-use, whereby not only is the recycling rate of various metal improved, but by means of elimination of toxic substances, environmental pollution by the remaining residues is reduced, while at the same time reducing the volume of the residual materials to be dumped.

Accordingly, the subject invention comprises a method for processing and utilizing metalliferous precipitates from gas cleaning and thermal waste treatment which occur as metalliferous aqueous sediments, metal sledges or the like in the cleaning waste. The method comprises the steps of subjecting the precipitates to a wet washing process, and separating moisture and metals volatile at low temperatures in a subsequent drying process. The volatile metals, such as mercury are recovered from the gaseous phase by condensation. After intermediate storage, if necessary, the metal waste so pretreated is then again brought into solution by hydrometalligurical means in order to be processed in a selective manner by means of ion exchange, electrolysis and/or metal ion extraction, to provide pure metal or metal compounds. Finally, all the gases occurring during the entire process, after the volatile metal components have been removed therefrom, are passed to a high temperature stage for detoxification and disposal.

DESCRIPTION OF THE PREFERRED EMBODIMENT

By virtue of the fact that the sludges are firstly subjected to a wet-washing process, coarser impurities, which could impair the subsequent process stages, are removed.

The heavy metal sludges are then dried, and metallic components which evaporate at environmental temperature, such for example as mercury, are drawn off together with the water vapor in a controlled manner. In this way, there results with the simplest procedure, firstly a particularly favorable initial separation and volume reduction. By means of controlled cooling, the water vapor condenses along with the easily-volatized heavy metals, which are thus simply separated and can be subjected to separate further treatment.

Should the metal waste thus initially treated, after any necessary intermediate storage, again be brought into solution by means of hydrometallurgical methods known per se, pure metals or metal compounds may be selectively recovered by ion exchange, electrolysis and/or metal ion extraction. The amount of residues is reduced, and the toxicity of these residues is reduced.

At this stage all gases occurring during the entire processing after the volatile metallic components have been withdrawn therefrom, may advantageously be passed to a high temperature stage, which in turn advantageously forms an integral part of the thermal waste treatment plant. In the high temperature stage, the gases can be detoxified and thereafter disposed of without problems, so that the method according to the invention, with respect to the gaseous phase, is free of emissions of heavy metals.

Hydrogen sulphide released during hydrometallurgy may, as an alternative to the high-temperature disposal, be converted by oxidation into sulphur or sulphate ions and thus may be directly forwarded for reuse.

Thermal waste treatment plants provide superfluous energy which is available in the form of exhaust heat, and frequently also as electrical energy. Thus the energy requirement for the preparation process may be covered without additional or extraneous energy. If during the selective hydrometallurgical processing, the separation of chloride ions or such anions and precipitation products dispersed in the metallic waste, such as metal hydroxides, sulphides and carbonates, is improved and accelerated by the addition of flotation agents, the economy of the method according to the invention may be appreciably increased.

The cleaning water from the wet-washing stage of the metal waste can be returned together with the vapors occurring during the drying process, to the waste water circuit of the gas-washing phase. In this way the process may also be carried out in an environmentally neutral manner also as regards the waste water.

A further improvement to the method may be achieved in that the cleaned and dried metal compounds are mixed before the hydrometallurgical processing with an appropriate binding agent, which does not impair the subsequent treatment process, and compressed to form treatable pellets or the like. Intermediate storage for reasons of production process control or any transport becoming necessary are simplified by this measure.

What is claimed is:

1. A method for processing hetrogeneous metal-containing deposits recovered from the cleaning of synthesis gas produced during the thermal treatment of wastes containing metals, including volatile metals, in equipment having a heating enclosure and a waste liquid container, said method comprising the steps of:

heating waste materials containing metals and volatile metals in the heating enclosure to produce synthesis gas including metal-containing deposits;

recovering the metal-containing deposits from the synthesis gas;

wet washing the metal-containing deposits with a washing liquid to produce washed metal-containing deposits and a run-off washing liquid;

separating the run-off washing liquid from the washed metal-containing deposits;

drying the washed metal-containing deposits to produce dried metal-containing deposits and a hetrogeneous vapor which contains the volatile metal elements and evaporated washing liquid;

condensing the hetrogeneous vapor to produce recovered evaporated washing liquid, first residual gases and the volatile metal elements;

separating the recovered evaporated washing liquid from the volatile metal elements after condensing the hetrogeneous vapor;

hydrometallergically bringing the dried metal-containing deposits into solution to produce pure metals and metal compounds in the solution while producing second residual gases;

separating the pure metals and metal compounds from the solution to leave a residual solution and third residual gases;

directing the run-off washing liquid, the recovered evaporated washing liquid and the residual solution to the waste liquid container; and directing the first, second and third residual gases into the heating enclosure.

2. A method as set forth in claim 1 including the step of extracting heat from the synthesis gas immediately after recovering the metal-containing deposits from the synthesis gas, and using the heat for the step of drying the washed metal-containing deposits.

3. A method as set forth in claim 1 including oxidizing the first, second and third residual gases prior to directing same to the heating enclosure.

4. A method as set forth in claim 1 including adding binders to the dried metal-containing deposits to produce pellets, and storing the pellets for a period of time, said step of hydrometallergically bringing the dried metal-containing deposits into solution being further defined as bringing the pellets into solution following the period of time in storage.

* * * * *